June 1, 1926.
H. S. BULFER
HARROW CART
Filed Dec. 16, 1924
1,587,467
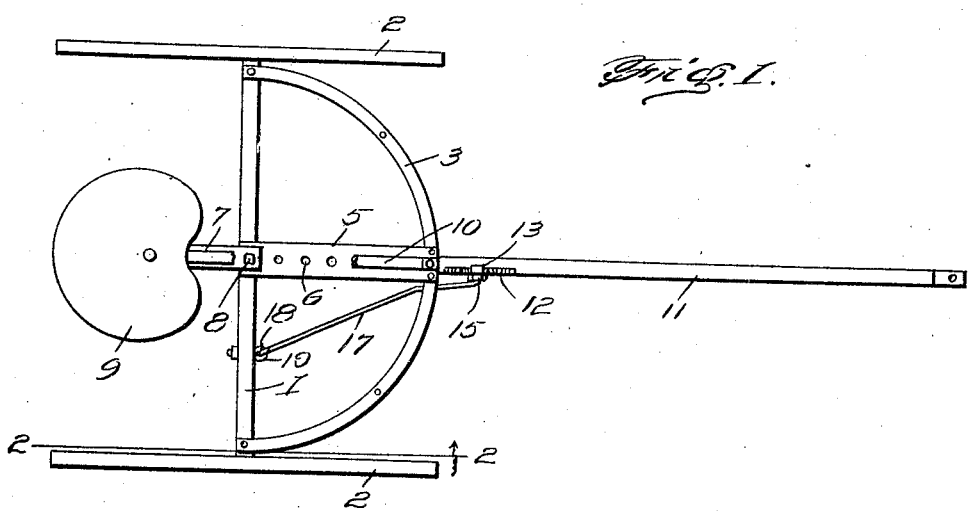
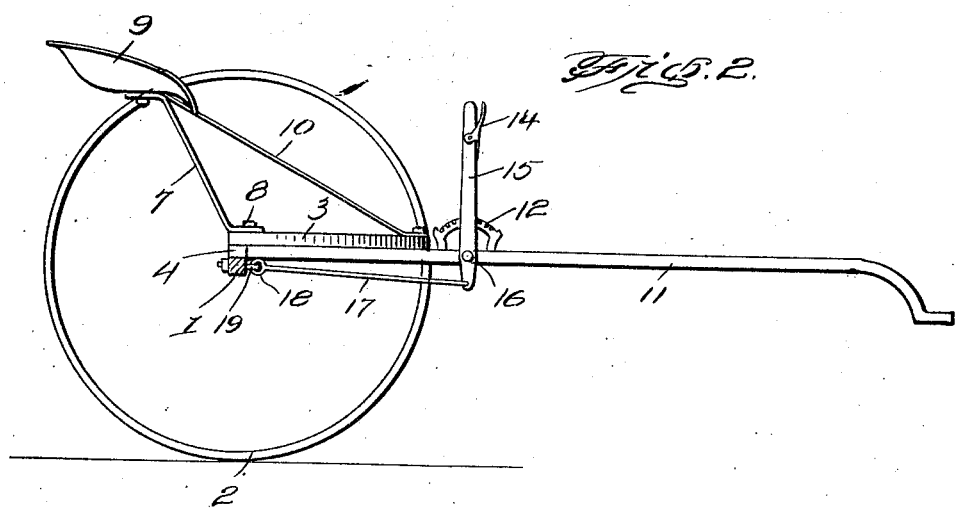
Inventor
H. S. Bulfer,
By Clarence A. O'Brien.
Attorney Patented June 1, 1926.

1,587,467

UNITED STATES PATENT OFFICE.

HAYES S. BULFER, OF GARDEN CITY, MINNESOTA.

HARROW CART.

Application filed December 16, 1924. Serial No. 756,256.

This invention relates to improvements in harrow carts, and has for its principal object to provide means whereby the cart is adapted to be disposed at various angles with respect to the tongue, the forward end of which is associated with a harrow, whereby the occupant of the cart may readily see what part of the ground has already been harrowed.

A further object of the invention is to provide a harrow cart of the above mentioned character, wherein the cart is provided with means for manually adjusting the axle and the wheels thereon on a vertical pivot, with respect to the tongue and harrow associated with the latter, without necessitating the occupant of the car having to leave the seat.

A still further object of the invention is to provide a harrow cart of the above mentioned character, which is simple in construction, inexpensive, strong and durable, and further well adapted for the purposes for which it is designated.

Other objects and advantages of this invention will become apparent during the course of the following description.

In the accompanying drawing, forming a part of this specification, and in which like numerals designate like parts throughout the same:

Figure 1 is a top plan view of the harrow cart embodying my invention, and

Figure 2 is a sectional view, taken approximately upon the line 2—2 of Figure 1.

In the drawing, wherein for the purpose of illustration is shown the preferred embodiment of my invention, the numeral 1 designates the axle, on the ends of which are supported the ground engaging wheels 2. An arcuate shaped member 3 is secured at its free ends to the axle 1, and a block 4 is interposed between the free ends of the arcuate member 3 and the axle 1, as is clearly illustrated in Figure 2.

A flat bar 5 is secured at its respective ends to the intermediate portions of the arcuate shaped member 3 and the axle 1, as clearly illustrated in Figure 1. The bar 5 is provided with a series of spaced openings 6 and provides a means whereby the seat support 7 may be secured at its lower end in one of the openings, as illustrated at 8. The seat 9 is mounted on the upper end of the seat support 7 in the usual manner.

The provision of the openings 6 provides a means whereby the seat may be adjusted either forwardly or rearwardly. A brace 10 for the seat 9, is illustrated in Figure 2, and the same extends from the seat 9 to the intermediate portion of the arcuate shaped member 3.

The tongue 11 is adapted to be associated with any well known type of harrow as shown, at its forward end, and the rear end of the tongue extends below the arcuate member 3 and is pivotally secured intermediate the ends of the axle 1, for the purpose to be presently described. A segmental rack member 12 is mounted on the tongue 11, at a point adjacent the arcuate shaped member 3, and cooperating therewith is a suitable locking pawl 13, associated with the auxiliary lever 14, the latter being associated with the upper end of the lever 15. The lever 15 is pivotally supported adjacent its lower end, as at 16, on the tongue 11. A rod 17 is secured at its forward end to the lower end of the lever 15, and the rear end of the rod is provided with an eye portion 18, adapted for engagement with the eye bolt 19, which is carried by the axle 1, at a point intermediate one end of the axle and the pivotal connection between the rear end of the tongue and the axle, as is clearly illustrated in Figure 1.

With the parts arranged as shown in Figure 1 of the drawing, the axle 1 is supported against pivotal movement with respect to the tongue 11, thus causing the cart to be in direct line with the harrow. By actuating the lever 15, after the locking pawl 13 has been disengaged from the segmental rack member 12, through the medium of the auxiliary handle 14, the rod 17 will cause the axle 1 to swing on the vertical pivot associated with the rear end of the tongue in either direction, with respect to the tongue depending upon the direction in which the lever 15 has been moved. The locking pawl 13 will hold the axle and wheel 2 in the desired adjusted position.

The provision of a cart of this character enables the occupant of the cart to readily see what part of the ground has already been harrowed, and furthermore when the harrow is in operation and the wind is blowing, by swinging the cart out of alignment with the harrow, the occupant of the cart will not be annoyed by the dust caused by the operation of the harrow and the wind. The simplicity in which my cart is constructed enables the same to be easily and efficiently operated, and will save considerable time and labor in ascertaining what part of the ground has already been harrowed.

While I have shown the preferred embodiment of my invention it is to be understood that various changes in the size, shape, and arrangement of parts may be resorted to, without departing from the spirit of the invention and scope of the appended claims.

I claim:

1. A harrow cart comprising an axle, ground engaging wheels on the respective ends thereof, an arcuate shaped member secured at its free ends to said axle adjacent the respective ends thereof, a bar interposed between the intermediate portions of the axle and arcuate shaped member respectively, a seat support secured on said bar, a tongue pivotally secured at its rear end to the intermediate portion of said axle and disposed below the arcuate shaped member, and means for removing the axle on said pivot.

2. A harrow cart comprising an axle, ground engaging wheels on the respective ends thereof, an arcuate shaped member secured at its free end to said axle adjacent the respective ends thereof, a bar interposed between the intermediate portion of the axle and the arcuate shaped member respectively, a seat support secured on said bar, a tongue pivotally secured at its rear end to the intermediate portion of the axle and disposed below the arcuate shaped member, and means for swinging the axle on the aforementioned pivotal connection, said means including a lever pivotally supported adjacent its lower end on said tongue, a rod secured at its respective ends to the lower end of the lever and said axle adjacent one end of the latter.

In testimony whereof I affix my signature.

HAYES S. BULFER.